United States Patent [19]

Shigemoto

[11] Patent Number: 5,187,624
[45] Date of Patent: Feb. 16, 1993

[54] MAGNETIC HEAD CARRIAGE WITH REINFORCING RIBS

[75] Inventor: Tatsuhiko Shigemoto, Kanagawa, Japan

[73] Assignee: Sony Corporation, Tokyo, Japan

[21] Appl. No.: 814,694

[22] Filed: Dec. 30, 1991

Related U.S. Application Data

[62] Division of Ser. No. 525,607, May 21, 1990.

[30] Foreign Application Priority Data

May 25, 1989 [JP] Japan .................................. 1-132431
May 25, 1989 [JP] Japan .................................. 1-132432

[51] Int. Cl.$^5$ ........................... G11B 5/48; G11B 5/60
[52] U.S. Cl. ..................................... 360/104; 360/103; 360/105
[58] Field of Search ............... 360/104, 103, 108, 105, 360/130.3–130.34

[56] References Cited

U.S. PATENT DOCUMENTS

| 4,605,979 | 8/1986 | Inoue et al. ............... | 360/105 |
| 4,807,054 | 2/1989 | Sorensen et al. ........... | 360/104 |
| 4,996,616 | 2/1991 | Aoyagi et al. ............. | 360/104 |

FOREIGN PATENT DOCUMENTS

| 60-226080 | 11/1985 | Japan .......................... | 360/103 |
| 63-144473 | 6/1988 | Japan .......................... | 360/103 |
| 63-144475 | 6/1988 | Japan .......................... | 360/103 |
| 1248372 | 10/1989 | Japan .......................... | 360/103 |

*Primary Examiner*—David J. Severin
*Assistant Examiner*—Alfonso Garcia
*Attorney, Agent, or Firm*—Lewis H. Eslinger; Jay H. Maioli

[57] ABSTRACT

To reduce the number of parts of a floppy disk drive as well as the steps required for assembling the floppy disk drive, a shielding ring for protecting a magnetic head from the influence of an external magnetic field, and an engaged portion to be engaged with a feed screw so as to drive the magnetic head, are formed integrally with a carriage for carrying the magnetic head, for example, by press working sheet metal.

4 Claims, 6 Drawing Sheets

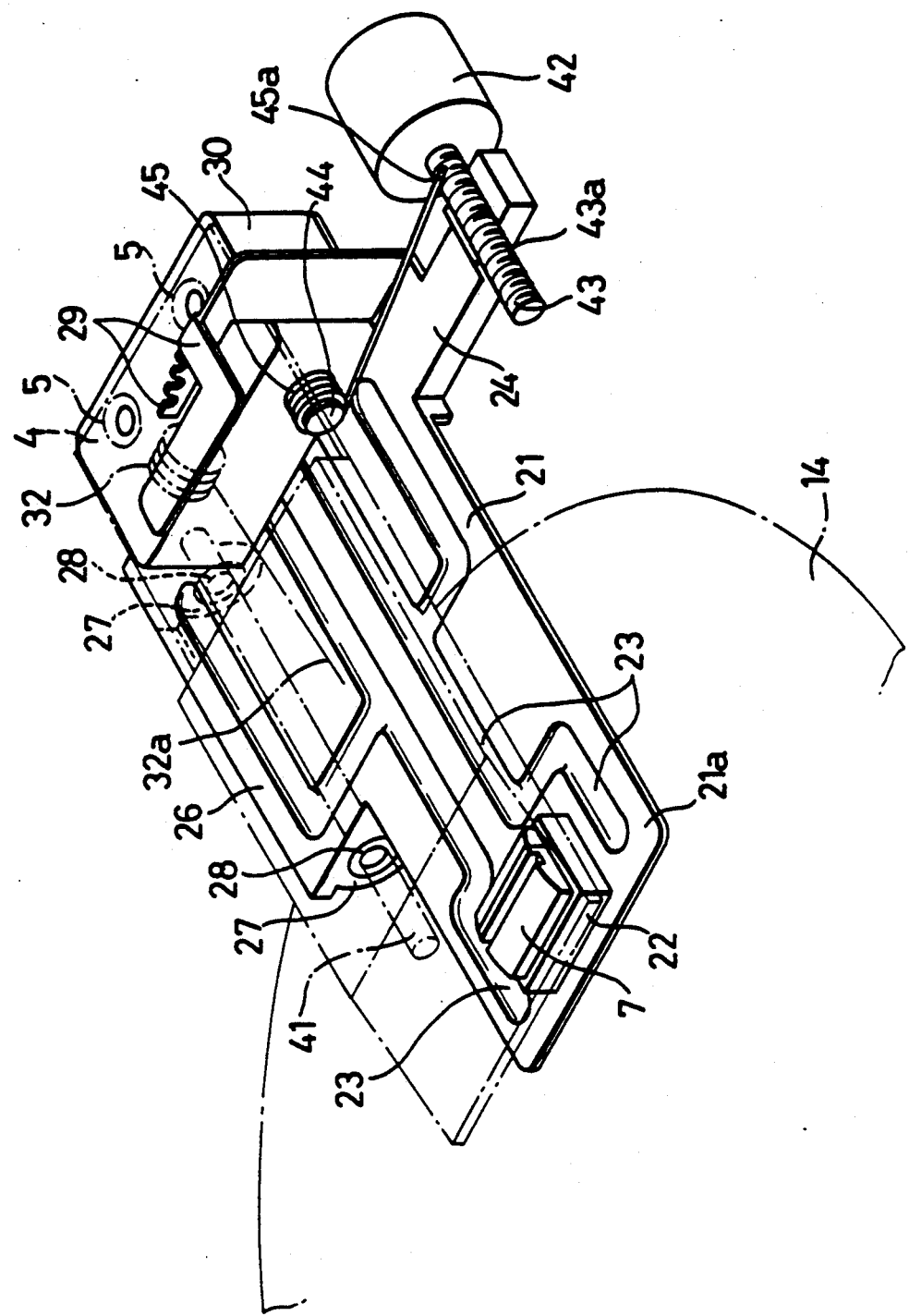

MAGNETIC HEAD CARRIAGE WITH REINFORCING RIBS

This is a division of application Ser. No. 07/525,607, filed May 21, 1990, now allowed.

BACKGROUND OF THE INVENTION

1. Field of the Invention

This invention relates to a floppy disk drive which comprises a magnetic head required for recording information on and/or reproducing information from a floppy disk, a carriage for carrying the magnetic head, and drive means for driving the carriage so as to enable the magnetic head to scan a track formed on a side of the floppy disk.

2. Description of the Prior Art

Head supporting members, such as a head carriage 1 and a head support arm 2 shown in FIG. 4, have been made of synthetic resin so far. According to FIG. 4, the proximal end 2a of the head support arm 2 is secured to an arm supporting block 3, which is formed integrally with the proximal end of the head carriage 1, through a hinge plate 4 with screws 5. A pair of upper and lower gimbal plates 6 made of leaf spring are welded to the respective free ends 1b and 2b of the head carriage 1 and the head support arm 2 on the peripheries 6a thereof so as to face each other, and thereby, a pair of upper and lower magnetic heads 7 which are stuck on the respective centers 6b of the gimbal plates 6 are resiliently supported by the gimbal plates 6.

Moreover, a pair of upper and lower shielding rings 8 are stuck on the respective gimbal plates 6 so as to surround the magnetic heads 7, and shield covers 9 are stuck on the respective other sides of the free ends 1b and 2b of the head carriage 1 and the head support arm 2, which are opposite to the sides to which the respective gimbal plates 6 are secured. Each gimbal plate 6 is supported by a pin 10, which projects from each free end 1b, 2b of the head carriage 1 and the head support arm 2, at the center thereof and on the other side opposite to the side to which the magnetic head 7 is secured.

A pair of flexible printed-circuits 11 are arranged respectively along the head carriage 1 and the head support arm 2 so as to face each other, and each end 11a of the printed circuits 11 and a plurality of terminals 12 which project from the magnetic heads 7 are soldered together. Further, intermediate portions 11b of the printed circuits 11 are welded to the head carriage 1 and the head support arm 2, respectively, through projections 13 projecting therefrom.

When put into action, a pair of magnetic heads 7 are brought into elastic contact with the respective sides of a floppy disk 14, which is one example of a disk-like recording medium, and mounted on a floppy disk drive, and while the head carriage 1 is discretely moved together with the head support arm 2 in the radial direction of the floppy disk 14, information is recorded on or reproduced from the rotating floppy disk 14 selectively through one of the magnetic heads 7. At that time, the shielding ring 8 and the shield cover 9 prevent the magnetic heads 7 from being influenced by an external magnetic field.

In the meanwhile, the shielding ring 8 made of magnetic material is small in size as shown in FIGS. 5A and 5B, and must be stuck on the gimbal plate 6 in accordance with a predetermined direction. In an actual process, after the magnetic head 7 is stuck on the center 6b of the gimbal plate 6, the periphery of the magnetic head 7 is coated with a synthetic resin 20 (FIG. 5B) to reinforce adhesion of the magnetic head 7, and before the synthetic resin 20 is cured, the shielding ring 8 is immersed in the synthetic resin 20 to adhere to the gimbal plate 6. Therefore, it is required to perform the sticking operation of the shielding ring 8 in a short period of time and with high accuracy to surround the magnetic head 7. The periphery 6a of the gimbal plate 6 is, thereafter, welded to the head carriage 1 or the head support arm 2.

Thus, there are some perplexing problems that the shielding ring 8 made of magnetic material is expensive; that the ring 8 is a separate part from the head carriage 1 and the head support arm 2, so that the assembling cost entailed; is too high, that it is very troublesome to stick the small ring 8 on the gimbal plate 6 so as to be in an accurate position and in accordance with the predetermined direction; and that the process of attaching the gimbal plate 6, on which the magnetic head 7 and the shielding ring 8 have been already stuck as described above, to the head carriage 1 or the head support arm 2 results in increasing the number of parts and the steps required for assembly, and raising the manufacturing cost.

Secondly, the head carriage 1 and the head support arm 2 are driven by a stepping motor (not shown) generally in such a way that, as shown in FIG. 6, one end of a needle bar 16 made of steel wire, or the like is put on a bracket which is integrally formed with the head carriage 1, and fixed to the bracket 15 by means of laying a plate 17 over the end of the needle bar 16, and fastening the plate 17 with screws 18 tightly to the bracket 15, and the other end of the needle bar 16 is engaged with the groove 19a of a feed screw 19 which is driven by the stepping motor. As a result, the head carriage 1 and the head support arm 2 are discretely moved in the radial direction of the floppy disk 14 due to the torque of the stepping motor.

Thus, there are other perplexing problems that the needle bar 16 is a separate part from the head carriage 1, so that the number of parts and the steps required for assembly are increased, and thereby, the manufacturing cost is raised; and that the screws 18 to fasten the plate 17 are apt to be loosened by vibrations, or the like, and results in imparting lost motions to the needle bar 16, or having the needle bar 16 fall from the bracket 15, so that the reliability of the floppy disk drive is lowered.

OBJECTS AND SUMMARY OF THE INVENTION

Accordingly, it is an object of the present invention to provide a floppy disk drive in which a shielding ring member is formed integrally with a head carriage by press working sheet metal, so that the number of parts and the steps required for assembly are reduced, and as a result, the manufacturing cost is lessened.

Another object of the invention is to provide a floppy disk drive in which a magnetic head is fitted, by press fit, into a shielding ring member which is formed integrally with a head carriage by press working sheet metal, or stuck on the head carriage on the inside of the shielding ring member, so that the steps required for attaching the magnetic head becomes simple, and to attach the magnetic head becomes easy.

A further object of the invention is to provide a floppy disk drive in which a shielding ring member is not made of magnetic material, and is not a separate part from the head carriage, so that it becomes possible to reduce the manufacturing cost.

Still a further object of the invention is to provide a floppy disk drive in which a magnetic head is protected from the influence of an external magnetic field not only by a shielding ring member but also by a head carriage formed by press working sheet metal, so that the magnetic shielding becomes fairly perfect.

Still another object of the invention is to provide a floppy disk drive in which an engaged portion to be engaged with a feed screw is formed integrally with a head carriage by press working sheet metal, so that the number of parts and the steps required for assembly are reduced, and as a result, the manufacturing cost is lessened.

Still another object of the invention is to provide a floppy disk drive in which an engaged portion to be engaged with a driver feed screw is formed integrally with a head carriage by press working sheet metal so as not to impart lost motions to the engaged portion, or have the engaged portion separated from the head carriage, so that the reliability of the floppy disk drive is raised, and further, the head carriage moves smoothly with high accuracy by a torque of the feed screw.

Still another object of the invention is to provide a floppy disk drive in which ribs provided to reinforce a head carriage are formed together with the head carriage when the head carriage is made by press working sheet metal, so that the head carriage becomes not only thin in thickness and light in weight but also high in rigidity.

In accordance with an aspect of this invention, in a floppy disk drive having a magnetic head required for recording information on and/or reproducing information from a floppy disk; a carriage for carrying the magnetic head; and drive means for driving the carriage so as to enable the magnetic head to scan a track formed on a side of the floppy disk, the carriage is made of sheet metal to have a hole of substantially the same size as the magnetic head, and a shielding ring which surrounds the hole; and fixed to the inside of the shielding ring is the magnetic head.

In a preferred embodiment of the invention, the magnetic head is fixed to the shielding ring with adhesive. Terminals provided on the back of the magnetic head are connected to a circuit which is arranged along the lower face of the carriage, and through which a signal given from the magnetic head is sent. Further, a shield cover is secured to the back face of the carriage so as to cover the hole on the inside of which the magnetic head is stuck, and to cover the periphery of the hole.

In a floppy disk drive having a magnetic head required for recording information on and/or reproducing information from a floppy disk; a carriage for carrying the magnetic head; and drive means for driving the carriage so as to enable the magnetic head to scan a track formed on a side of the floppy disk, the drive means comprises a feed screw and a motor for driving the feed screw; the carriage which has an engaged portion to be engaged with the groove of the feed screw is formed by press working sheet metal; and a torque of the motor is transmitted to the carriage through the feed screw and the engaged portion of the carriage.

In a floppy disk drive having a magnetic head required for recording information on and/or reproducing information from a floppy disk; a carriage for carrying the magnetic head; and drive means for driving the carriage so as to enable the magnetic head to scan a track formed on a side of the floppy disk, the carriage is made of sheet metal; the magnetic head and a supporting block, to which a head support arm is secured, are provided at the distal end and the proximal end of the carriage, respectively; and ribs are formed between the magnetic head and the supporting block to reinforce the carriage, at the time of press working sheet metal.

The above, and other objects, features and advantages of this invention, will be apparent from the following detailed description of an illustrative embodiment thereof to be read in connection with the accompanying drawings, wherein like reference numerals identify the same or corresponding parts in the several views.

BRIEF DESCRIPTION OF THE DRAWINGS

FIG. 3B is a perspective view of the head carriage of FIG. 1;

DETAILED DESCRIPTION OF A PREFERRED EMBODIMENT

Figure 1:
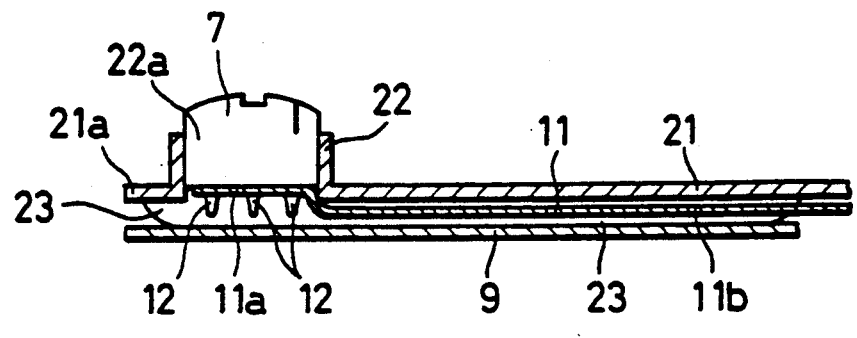
FIG. 1 is an enlarged sectional view illustrating a shielding ring formed together with a head carriage of a floppy disk drive according to an embodiment of this invention.
Figure 2:
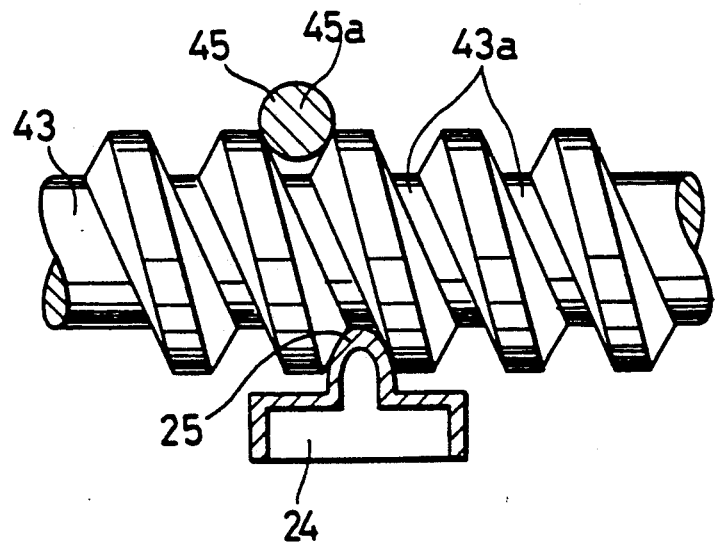
FIG. 2 is an enlarged sectional view illustrating an engaged portion of the head carriage of FIG. 1, which is engaged with a feed screw.

Referring to the drawings, a head carriage incorporated in a floppy disk drive embodying the present invention will be hereinafter described. A head carriage 21 shown in FIG. 1 is formed by press working sheet metal, and a shielding ring 22 formed by drawing during the press working extends upwards from the free end 21a of the head carriage 21. A magnetic head 7 is fitted, by press fit, into a space 22a formed inside the shielding ring 22, or stuck on the inside of the shielding ring 22 with adhesive, and a plurality of ribs 23 to reinforce the head carriage 21 are formed to project downwards from the head carriage 21.

A flexible printed-circuit 11 is arranged along the longitudinal direction of the head carriage 21 on the bottom face thereof between the ribs 23, one end 11a of the printed circuit 11 is soldered to a plurality of terminals 12 (including an earth terminal) provided in the magnetic head 7, or stuck on the terminals 12 by a conductive adhesive, and an intermediate portion 11b is fixed to the bottom face of the head carriage 21 with adhesive. Further, a shield cover 9 to cover the back face of the magnetic head 7 and the periphery thereof is fixed to the lowest faces of the ribs 23 with adhesive.

Figure 3A:
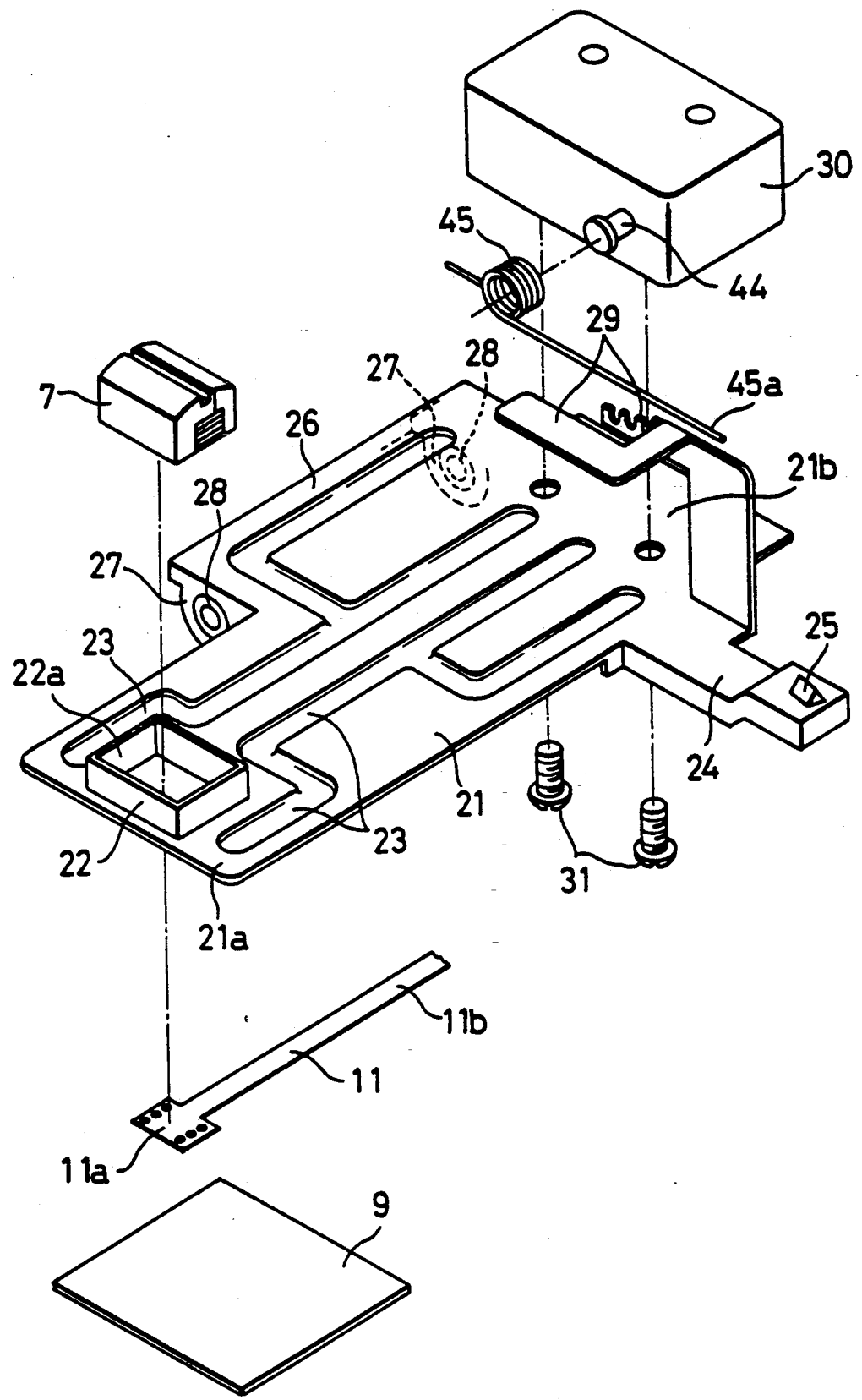
FIG. 3A is an exploded, perspective view of the head carriage of FIG. 1.
Figure 4:
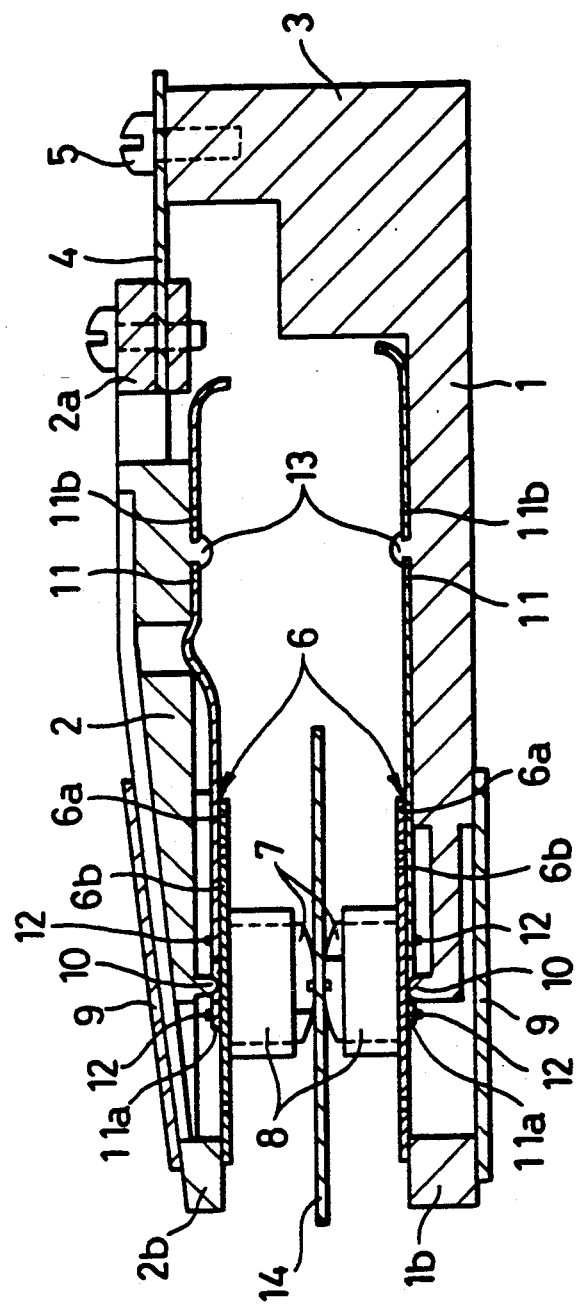
FIG. 4 is a sectional view of a conventional floppy disk drive.
Figures 5A, 5B:
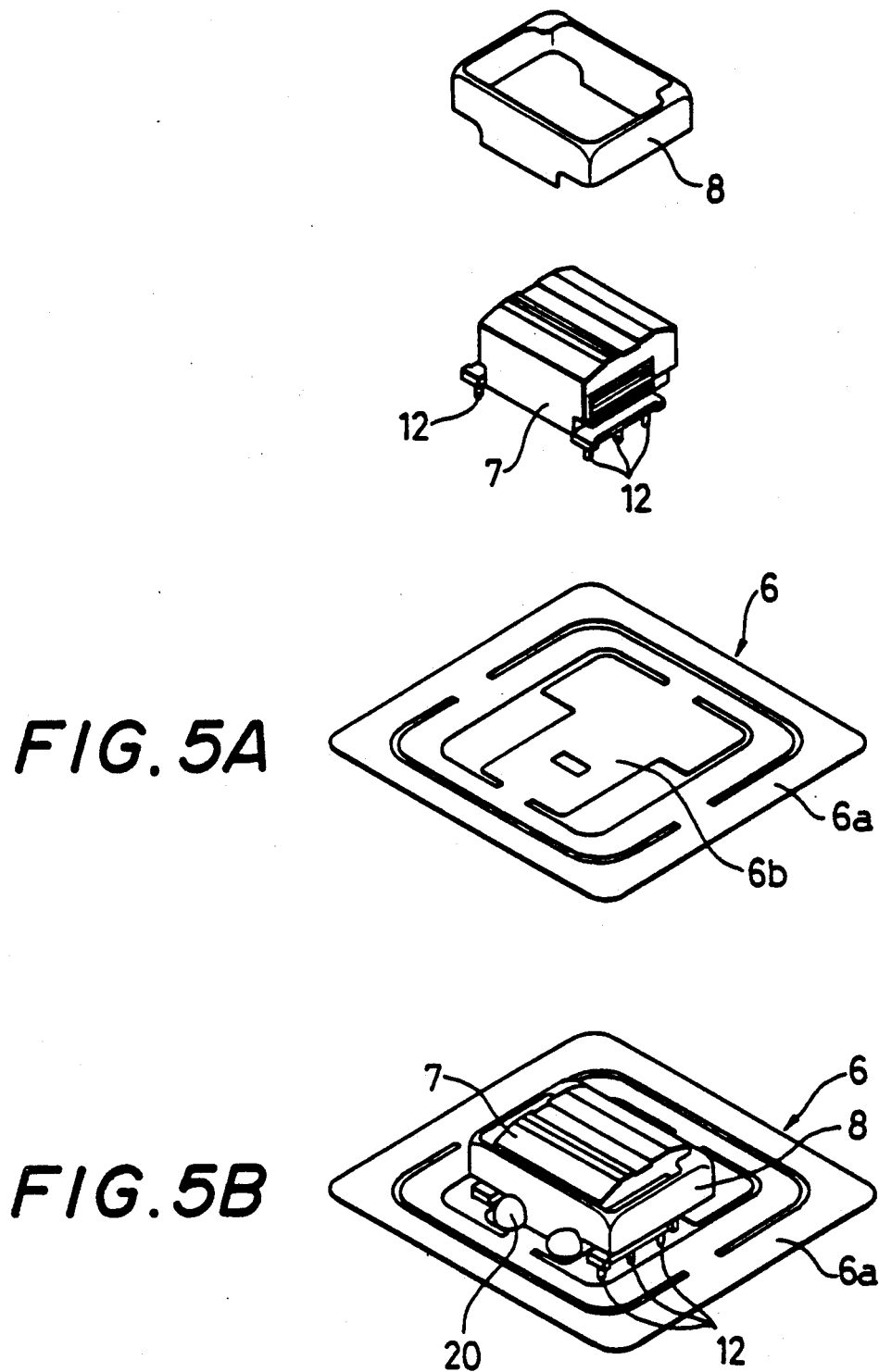
FIG. 5A is an exploded, perspective view of a shielding ring of the floppy disk drive of FIG. 4.
FIG. 5B is a perspective view of the shielding ring of FIG. 5A.
Figure 6:
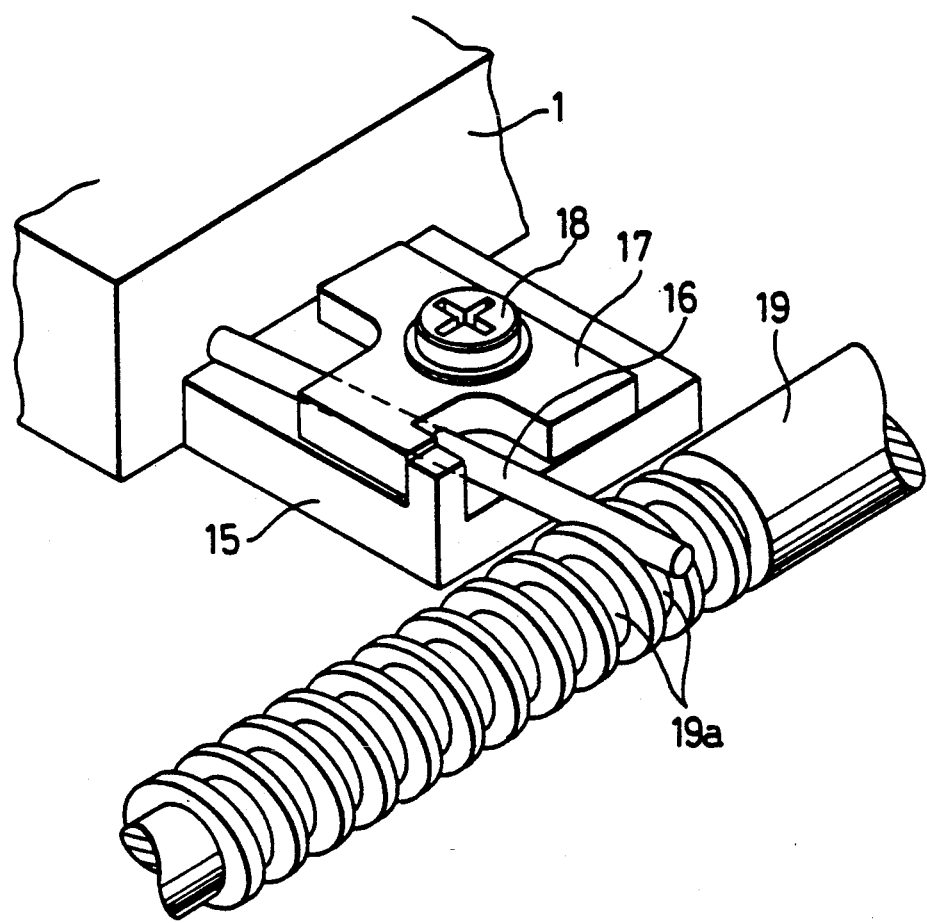
FIG. 6 is a perspective view of an engaged portion to be engaged with a feed screw, which is incorporated in the floppy disk drive of FIG. 4.

As shown in FIG. 3A, a narrow bracket 24 projects from one side of the proximal end 21b of the head carriage 21, and on the distal end of the narrow bracket 24, a engaged portion 25 to be engaged with the groove of a feed screw 43 is integrally formed. The engaged portion 25 is formed by drawing during the press working so as to project upwards from the bracket 24, and has the shape, for example, of the letter "V" in section.

Similarly, a wide bracket 26 projects from the other side of the proximal end 21b of the head carriage 21, and a pair of bearing blocks 27 are integrally provided thereunder. Into the bearing blocks 27, oilless thrust bearings 28 are fitted, respectively. In addition, a projection 29 for supporting a torsion coiled spring 32 (FIG. 3B) is formed integrally near the narrow bracket 24.

As shown in FIG. 3B, a supporting block 30 is fixed to the top of the proximal end 21b of the head carriage 21 by a plurality of screws 31 (FIG. 3A), and one end of a hinge Plate 4 is fixed to the top of the supporting block 30 with screws 5. Further, a head support arm 2 is fixed to the other end of the hinge plate 4, and pressed downwards by one end 32a of the torsion spring 32 whose coiled portion is mounted on the projection 29, and the other end of which is pressed against the proximal end of the projection 29.

A guide shaft 41 horizontally supported by a chassis (not shown) of the floppy disk drive is inserted into the pair of thrust bearings 28, and the groove 43a of the feed screw 43, which is also supported by the chassis so as to be parallel to the guide shaft 41 and driven by a stepping motor 42, is engaged from above with the engaged portion 25 of the head carriage 21.

A torsion coiled spring 45 is provided so as to be supported by a projection 44 which projects from one side of the supporting block 30. One end of the spring 45 abuts against the face of the head carriage 21, and the other end 45a abuts, from above, against the feed screw 43 to press the groove 43a of the feed screw 43 against the engaged portion 25 of the head carriage 21.

When put in action, the pair of magnetic heads 7 supported respectively by the head carriage 21 and the head support arm 2 are brought into elastic contact with the upper side and the lower side of a floppy disk 14 due to force of the torsion coiled spring 32, and the head carriage 21 is discretely moved together with the head support arm 2 in the radius direction of the floppy disk 14, as the engaged portion 25 of the head carriage 21 is engaged with the feed screw 43 which is driven by the stepping motor 42. Thus, information is recorded on or reproduced from selectively either side of the rotated floppy disk 14 through the magnetic heads 7.

At that time, the magnetic head 7 is protected from the influence of an external magnetic field not only by the shielding ring 22 which is formed integrally with the head carriage 21 by sheet metal stamping and the shield cover 9 which is secured to the lowest faces of the ribs 23, but also by the entire head carriage 21.

Moreover, the engaged portion 25 of the head carriage 21, which is driven by the feed screw 43, is formed integrally with the head carriage 21 by press working sheet metal, so as not to impart lost motions to the engaged portion 25, or have the engaged portion 25 separated from the head carriage 21, so that the reliability of the floppy disk drive is raised, and further, the head carriage 21 moves smoothly and with high accuracy by a torque of the driven feed screw 43.

Having described an illustrative embodiment of this invention with reference to the accompanying drawings, it is to be understood that various modifications are possible within the scope of the appended claims, for example, the shape of the engaged portion 25 of the head carriage 21 may be different than the above-mentioned one.

What is claimed is:

1. A floppy disk drive assembly having a magnetic head for recording information on and/or reproducing information from a floppy disk, comprising: a carriage for carrying the magnetic head; and drive means for driving the carriage so as to enable the magnetic head to scan a track formed on a side of the floppy disk, in which the carriage is made of a generally planar sheet metal with flat edges; the carriage including at the proximal end thereof a supporting block to which a head support arm is secured and having the magnetic head attached at the distal end of the carriage, respectively, and two, press-worked, indented ribs are formed in said sheet metal carriage spaced apart from outer edges thereof, each of said ribs being bifurcated at an end thereof facing said supporting block to reinforce the carriage.

2. A floppy disk drive assembly according to claim 1, in which each of said ribs is formed to project outwardly from a surface of said carriage opposite to a side having the magnetic head mounted thereon.

3. A floppy disk drive assembly according to claim 2, in which said supporting block is attached to said carriage by a plurality of screws.

4. A floppy disk drive assembly according to claim 2, further comprising a flexible printed circuit electrically connected to said magnetic head and being arranged on said sheet-metal carriage between said two ribs.

* * * * *